UNITED STATES PATENT OFFICE.

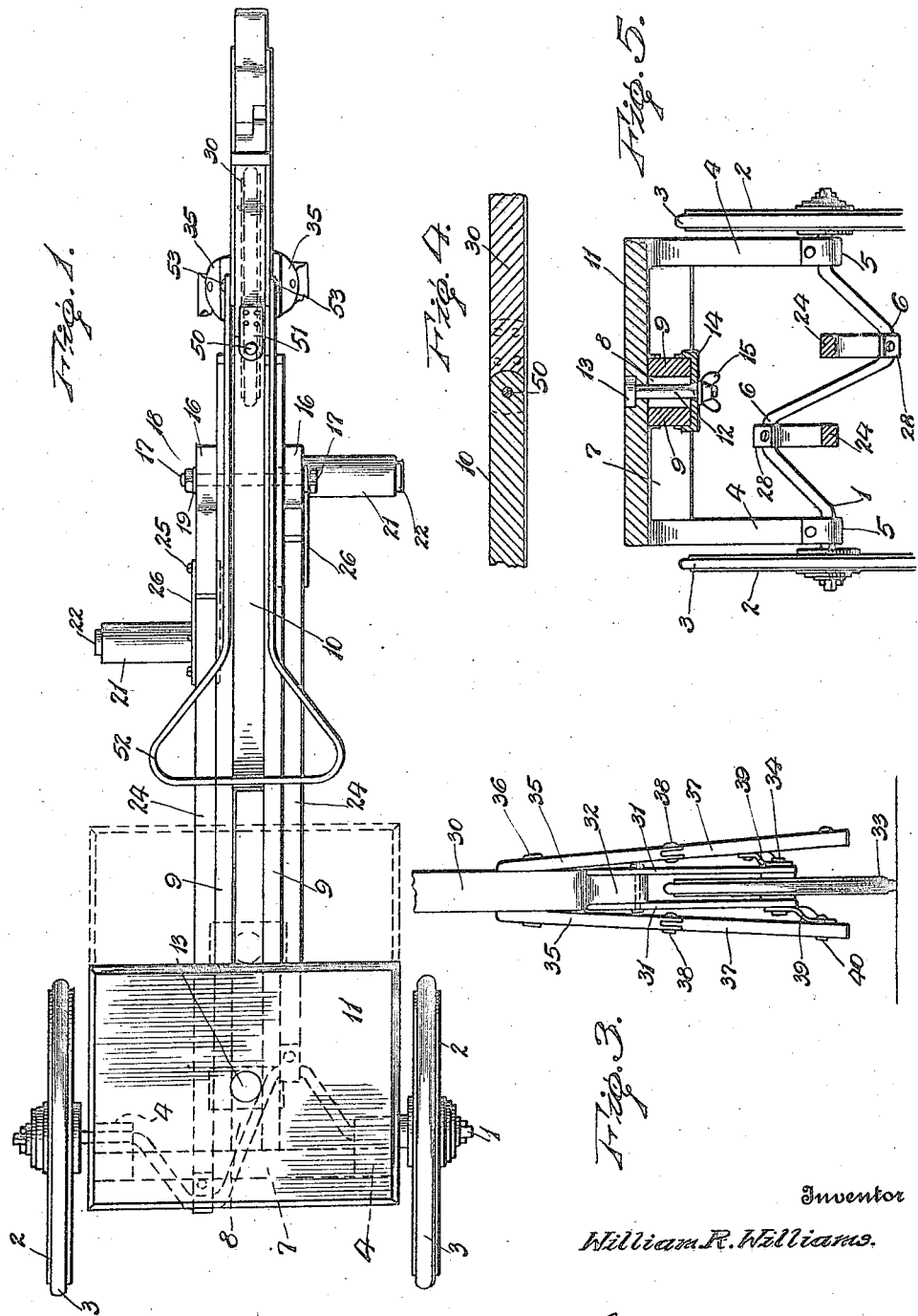

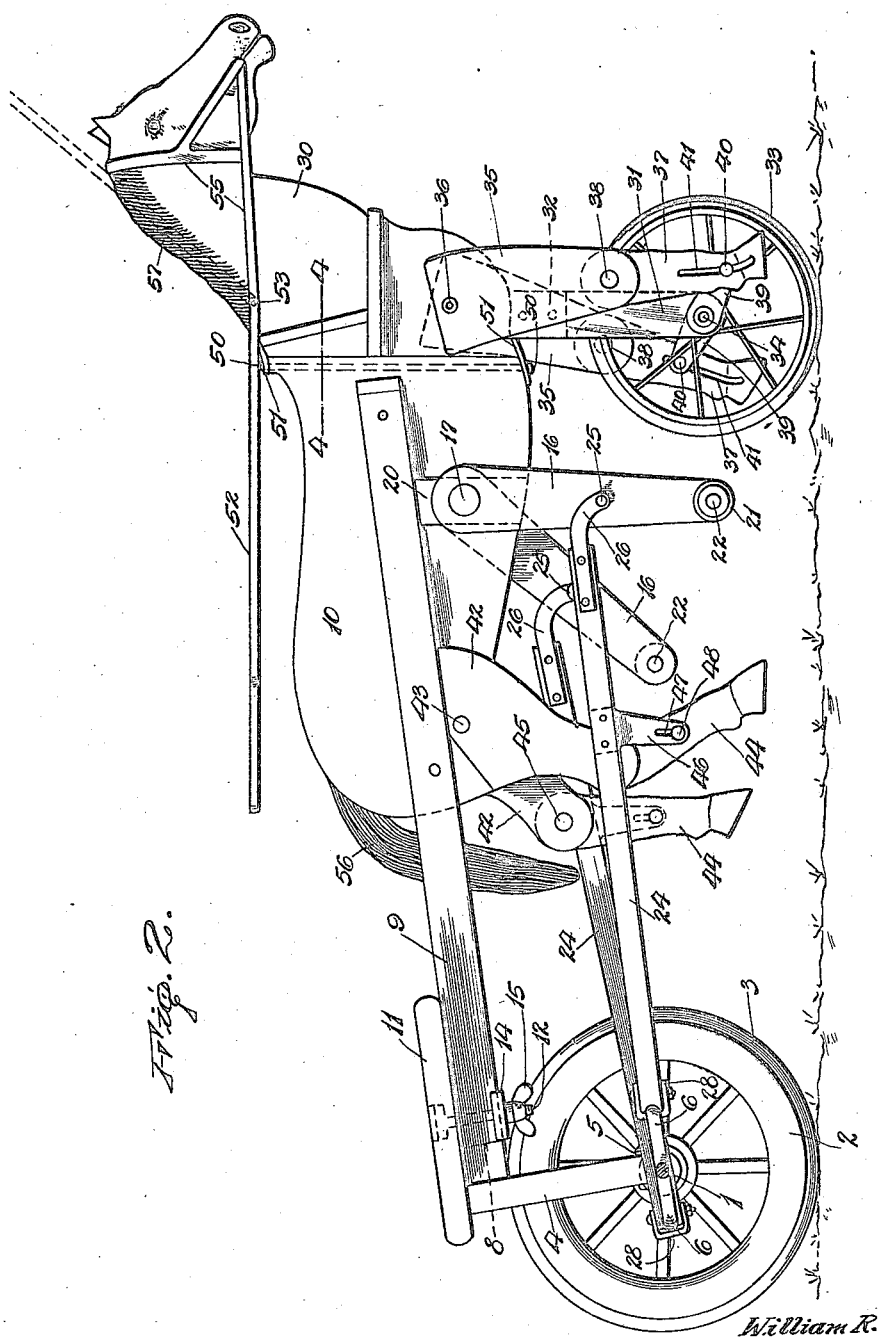

WILLIAM R. WILLIAMS, OF OWENSBORO, KENTUCKY.

VELOCIPEDE.

1,419,341.  Specification of Letters Patent.  Patented June 13, 1922.

Application filed March 19, 1921. Serial No. 453,727.

*To all whom it may concern:*

Be it known that I, WILLIAM R. WILLIAMS, a citizen of the United States, residing at Owensboro, in the county of Daviess and State of Kentucky, have invented certain new and useful Improvements in Velocipedes, of which the following is a specification.

This invention relates to toys of the velocipede type and one of the principal objects is the provision of a two-wheeled cart rigidly connected to a wooden horse corresponding in size to said cart, the horse having imitation harness such that the combination of said horse and cart will give the appearance of a small horse in harness and hitched to the cart.

Another feature of the invention is the provisions of pedals connected to the body of the horse and with a double crank axle which supports the wheels of the cart, whereby the rider is enabled to propel the entire device and thereby obtain much pleasure and healthful exercise. The invention is so arranged that both the front and hind legs of the horse are actuated in such a manner as to cause them to move at the knee joints and also where they are connected at their topmost portions in close simulation of the actual leg movements of a live horse when walking or running. The invention comprises further features as will be stated in the following detailed description.

In the practical development of this device for the market it may become necessary to make certain minor changes in the details of construction, but without a departure from the principle disclosed.

With reference to the drawings:

Figure 1 is a plan view of the device complete;

Fig. 2 is a side elevation of the device complete and ready for use;

Fig. 3 is an elevation of the lower portion of the front end of the apparatus;

Fig. 4 is a detail section on the line 4—4 of Fig. 2.

Fig. 5 is a transverse section through the seat.

The cart comprises an axle 1 and wheels 2 mounted thereon, the wheels being preferably equipped with rubber tires 3 and either or both wheels being secured to the axle so that rotation of the axle will be imparted to the wheels and the vehicle thereby propelled. Standards 4 rise from the axle and carry bearings 5 at their lower ends in which the axle rotates, the intermediate portion of the axle being formed into cranks 6. Secured in any convenient manner to and extending between the upper ends of the standards is a cross bar 7. Secured to the cross bar 7 at the center thereof is a block 8 forming a separator between the parallel side bars 9, the rear ends of which are secured to the block while their front ends are connected to the body of the horse, which is shown at 10. A seat board 11 is provided and is held in place by a bolt 12, a countersunk hole in the center of the board 11 receiving the head 13 of the bolt. A flanged plate 14 has a central hole through which the bolt 12 passes and a winged nut 15 on the bolt and bearing against the plate permits the seat to be quickly and easily shifted, as shown by dotted lines in Fig. 1, but, when turned home, firmly secures the seat. The device is thus adjustable to almost any size of child which is a particular advantage and a simple arrangement.

Swinging pedals 16 are secured to the body 10 by bolt 17 and nut 18 with washer 19, spacing blocks 20 being used. Secured to the lower ends of pedals 16 are foot-rests 21 by bolts 22. Pitmen 24 are provided, their front ends being pivotally secured to pedals 16 by pins 25 and straps 26, as shown in Fig. 1. The rear ends of pitmen 24 are secured to crank axle 1 by means of straps 28. It will now be seen that as the foot-rests 21 are actuated by the feet, the pedal 16, swinging loosely, will revolve the axle 1 causing the entire device to move forward.

The head or front portion of the horse is shown at 30. Metal hangers or straps 31 are connected to a tongue 32 on the under side of the head portion of the horse, and a wheel 33, which is also rubber tired, supports the front portion of the toy, being mounted between the hangers on an axle 34 carried by the lower ends of the same. The front legs each consists of an upper portion 35 pivotally connected to the head portion 30 by bolt 36 and a lower portion 37 connected to the upper portion by a pivot pin 38. Cranks 39 extending in diametrically opposite directions from the axle 34 have pins or studs 40 at their free ends which slide freely in elongated slots 41 in the lower portions of the respectively adjacent front legs. It will now be seen that when the device is in motion, the front wheel turning, the cranks 39 will revolve causing perfect knee action for the front legs.

Hind legs have upper portions 42 pivotally connected to the body 10 by a bolt 43, and lower portions 44 connected to the upper portions by pins 45. The knee action of the hind legs is attained by connecting the lower portions 44 to hangers 46 which have slots 47, said hangers being secured to the pitmen 24 and the leg members 44 carrying pins or studs 48 engaging the slots 47. The knee joints of both the front and hind legs are arranged so as to prevent their bending backwards, which is an unnatural movement and would tend to lock them.

The device is easily guided, as the entire front or head portion of the horse is pivotally connected with the main body 10 of the figure. A vertical rod 50 extends through the body 10 in a fixed position at a point in rear of the tongue 32 and straps 31, and plates 51 secured to the head portion 30, pivotally engage the ends of the rod 50.

To represent the lines of harness, a frame 52 is provided, the ends of same having holes and connected to head portion 30 by pin 53. The dotted lines in Fig. 2 show the change of position of the steering frame when it is desired to pull the device instead of propelling the same by pedals.

Strips of leather 55 are connected to the head portion 30 to represent harness, or colored lines may be painted on the head for the same purpose, if desired.

A tail 56 and a mane 57 are provided, and are connected where shown in any approved manner, both the head and tail being of real hair.

Having thus described the invention, what is claimed as new is:

1. A velocipede comprising a cart, a figure connected with the cart and simulating an animal, a wheeled support for the front end of said figure, pedals pivotally hung upon the body of said figure, a cranked axle in the cart, pitmen connecting the pedals with the said cranked axle whereby to propel the velocipede, jointed legs pivotally hung upon the body portion of the figure in rear of the pedals, and pin and slot connections between the pitmen and the lower portions of the respective legs whereby as the velocipede is propelled a knee-bending action will be imparted to the legs.

2. A velocipede comprising a cart, a figure connected with the cart and simulating an animal, a wheeled support for the front end of the figure, pedals pivotally hung upon the body of the figure, a cranked axle in the cart, pitmen disposed at opposite sides of the figure and connecting the pedals with the said cranked axle whereby to propel the velocipede, jointed legs pivotally hung upon the body portion of the figure in rear of the pedals, hangers depending from the pitmen, and pin and slot connections between the said hangers and the lower portions of the respective legs whereby as the velocipede is propelled a knee-bending action will be imparted to the legs.

3. A velocipede comprising a cart including a cranked axle, and wheels on the axle, a figure simulating an animal, standards rising from the cranked axle, side bars connected with said standards and with the said figure, means on the figure for rotating the cranked axle, and a seat carried by the said side bars and adjustable longitudinally of the same.

4. A velocipede comprising a cranked axle, wheels on the said axle, standards rising from the axle, side bars connected with said standards and projecting forwardly therefrom, a figure simulating an animal secured between said side bars, means carried by said figure and connected with the cranked axle for propelling the velocipede, a seat resting upon the side bars, a flanged plate engaging the lower edges of the side bars, and a connecting bolt fitted through the seat and the said plate and provided with means whereby the plate and seat may be secured in set positions upon the side bars.

In testimony whereof I affix my signature.

WILLIAM R. WILLIAMS. [L. S.]